(12) United States Patent
Sato et al.

(10) Patent No.: US 6,670,067 B2
(45) Date of Patent: Dec. 30, 2003

(54) FUEL SUPPLY DEVICE FOR FUEL CELL

(75) Inventors: Katumi Sato, Wako (JP); Kazuya Aoki, Wako (JP); Kazunori Fukuma, Wako (JP); Tatsuya Sugawara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 94 days.

(21) Appl. No.: 09/924,496

(22) Filed: Aug. 9, 2001

(65) Prior Publication Data

US 2002/0022171 A1 Feb. 21, 2002

(30) Foreign Application Priority Data

Aug. 10, 2000 (JP) ...................................... P2000-243370

(51) Int. Cl.$^7$ ................................................. H01M 2/00
(52) U.S. Cl. ............................. 429/34; 429/12; 429/13; 429/17; 62/500
(58) Field of Search ............................... 62/500; 429/12, 429/13, 17, 34

(56) References Cited

U.S. PATENT DOCUMENTS 6,438,993 B2 * 8/2002 Takeuchi et al. .............. 62/500

* cited by examiner

Primary Examiner—Carol Chaney
Assistant Examiner—Dah-Wei Yuan
(74) Attorney, Agent, or Firm—Arent Fox Kintner Plotkin & Kahn, PLLC

(57) ABSTRACT

A fuel supply device is provided capable of supplying a necessary amount of fuel while ensuring predetermined stoichiometric characteristics over a wide range of flow rates. The body unit of the fuel supply device includes the first ejector, the second ejector, and a switching valve. The switching valve has a function to select either one of a first passage or a second passage for communicating with the valve chamber and to block the other passage. The first passage is communicated with a nozzle of the first ejector, and the second passage is communicated with a nozzle of the second ejector. The first ejector has a diffuser passage communicated with the reflux chamber, the second ejector has a diffuser passage communicated with the reflux chamber, and the diffuser passage 43 and the diffuser passage are connected with a hydrogen outlet through a merging passage.

4 Claims, 8 Drawing Sheets

FUEL SUPPLY DEVICE FOR FUEL CELL

BACKGROUND OF THE INVENTION

1. Field of the Invention

The present invention relates to a supply system for supplying fuels to a fuel cell.

2. Description of the Related Art

Conventionally, a solid polymer membrane-type fuel cell comprises a stack (hereinafter, called a fuel cell) constituted by a plurality of cells, wherein each cell is formed by inserting a solid polymer membrane between an anode and a cathode. Hydrogen is supplied to the anode as a fuel and air is supplied to the cathode as an oxidizing agent, wherein hydrogen ions generated at the anode is moved to the cathode through the solid polymer membrane and electric power is generated by a chemical reaction taking place at the cathode between the hydrogen ions and oxygen.

In order to preserve the ionic conductivity of the solid polymer membrane, an excess water content is added to the hydrogen to be supplied to the fuel cell using a humidification device. In order to prevent a gas passage from clogging due to water accumulating in the gas passage in the electrode, the exhaust fuel is set to a predetermined exhaust flow rate.

Recirculation of the exhaust fuel (hereinafter, this exhaust fuel is sometimes called reflux hydrogen) with the original fuel (hydrogen) makes it possible to increase the fuel efficiency, which results in increased energy efficiency of the solid polymer-type fuel cell.

A conventional example of such a type of fuel cell device is disclosed in, for example, Japanese Unexamined Patent Application, First publication No. Hei 9-213353. In the fuel cell device disclosed in the above-described publication, recirculation of the fuel is carried out by an ejector.

Below, the structure of an ejector is explained. As shown in FIG. 7, the conventional ejector comprises a reflux chamber 2 at the base end of the diffuser 1 which is in a form of a flared pipe, a reflux passage 3 communicated with the reflux chamber 2, and a nozzle 4, which is disposed on the same axial line as that of the diffuser and which is protruded into the diffuser 1. When the fuel to be supplied to the fuel cell is ejected from the nozzle 4 towards the diffuser, a negative pressure is generated at the throat portion 5 of the diffuser 1, the negative pressure draws hydrogen introduced into the reflux chamber 2 to form reflux hydrogen, and the reflux hydrogen is mixed with the hydrogen ejected from the nozzle 4 and the mixture is sent out from the outlet of the diffuser 1.

There is an index called a stoichiometric ratio, which represents the suction efficiency of the ejector. The stoichiometric ratio is defined as a ratio $Qt/Qa$ between $Qa$ and $Qt$, wherein $Qa$ is a flow rate ejected from the nozzle 4 (that is, the consumed hydrogen flow rate) and $Qt$ is a total flow rate discharged from the diffuser 1. When the flow rate of the reflux hydrogen is assumed to be $Qb$, since the total flow rate $Qt=Qa+Qb$, the stoichiometric ratio or the stoichiometric value is defined as $Qa+Qb/Qa$. When the stoichiometric value is defined as shown above, it is possible to say that the suction efficiency of the ejector increases as the stoichiometric ratio increases.

In a conventional ejector, since the diameter of the diffuser and the diameter of the nozzle for a diffuser are fixed, a diffuser is typically selected which satisfies a required range of flow rate of the fuel to be used.

FIG. 8 is a diagram, obtained by experiments, showing an example of the relationships between the stoichiometric value and the hydrogen supplying amount $Qa$ (hereinafter, this relationship is called "stoichiometric characteristics") using the nozzle diameter as a parameter for a fuel supply ejector of a fuel cell device. As shown in FIG. 8, although the increasing stoichiometric value is obtained as the nozzle diameter decreases, the hydrogen flow rate $Qa$ decreases. In contrast, although it is possible to increase the hydrogen flow rate $Qa$ by increasing the nozzle diameter, the stoichiometric value decreases.

As shown by a bold line in FIG. 8, a required stoichiometric value (hereinafter, called "a required stoichiometric value") for a fuel cell is determined depending on its driving conditions and the flow rates of hydrogen from the idling state to the full open output state changes by 10 to 20 times. Accordingly, it is not possible for one ejector to cover all of the required stoichiometric values.

In order to solve the above-described problem, it is possible to assume an ejector system which is provided with a first ejector for a large flow rate and a second ejector for a small flow rate, and to operate this ejector system such that the fuel is supplied normally using the second ejector for a small flow rate while maintaining the fuel passage to the second ejector in an opening state and when a higher flow rate higher than that of the second ejector is required, the first ejector is operated by opening a magnetic valve disposed for supplying the fuel to the first ejector so that the fuel is supplied by both first and second ejectors.

However, when the above-described ejector system is adopted and when the fuel is supplied using both first and second ejectors, the total aperture area of diffusers of both ejectors becomes too large for the amount of flow to be ejected from the nozzles of both ejectors, and the nozzle size and the optimum value of the diffuser becomes unbalanced, so that the stoichiometric characteristics cannot be satisfied at the time of high flow rate.

SUMMARY OF THE INVENTION

An object of the present invention is to provide a fuel supply device capable of preserving the predetermined stoichiometric characteristics over a wide range of flow rate.

According to the first aspect of the present invention, a fuel supply device (for example, an ejector unit 30 in the embodiment described below) for a fuel cell (for example, a fuel cell 11 shown in the embodiment described below) comprising: a plurality of ejectors (for example, a first ejector 40 or a second ejector 50 in the embodiment described below), each comprising a nozzle (for example, a nozzle 41 or a nozzle 51 in the embodiment described below) connected with a fuel passage for ejecting a first fuel (for example, hydrogen in the embodiment described below) and a diffuser (for example, a diffuser passage 43 or a diffuser passage 53 in the embodiment described below) which draws a second fuel (for example, reflux hydrogen in the embodiment described below) by a negative pressure generated by the ejection of the first fuel along the axis direction of the nozzle, for supplying the second fuel by merging with the first fuel; an ejector switching device (for example, a switching valve 60 in the embodiment described below) constituted so as to be able to select and switch any one of the fuel passages of the nozzle among the plurality of ejectors and a housing (for example, a unit body 33 in the embodiment described below) which includes the plurality of ejectors and the ejector switching device.

By constituting the fuel supply device as shown above, it is possible to select any one of the ejectors separately, and by setting different nozzle diameters and different ejector diameters for each ejector, the stoichiometric value may be changed in response to the fuel consumption. Here, the stoichiometric value means a ratio of an amount of a first fuel to the sum amount of the first fuel and a second fuel (that is, the total amount). In addition, since the housing includes a plurality of ejectors and an ejector switching device, the fuel supply device can be made compact.

According to the second aspect of the present invention, in the above fuel supply device for a fuel cell, the housing comprises a first fuel passage through which flows a portion of a first fuel in addition to the first fuel supplied to the nozzles of the plurality of ejectors, and said plurality of ejectors delivers fuel to said first fuel passage.

By the above constitution, the first fuel supplied from the ejector and a portion of the first fuel from the first fuel passage are merged in the first fuel passage and this merged fuel is delivered downstream.

According to the third and fourth aspects of the present invention, in the above fuel supply device for a fuel cell, the fuel supply device further comprises a control device for controlling the ejector switching device in response to an input signal corresponding to a required amount of flow.

By constituting the fuel supply device for a fuel cell as described above, it is possible to select and operate an ejector which is appropriate for the required amount of fuel flow.

DETAILED DESCRIPTION OF THE INVENTION

Hereinafter, embodiments of fuel supply devices for a fuel cell will be described with reference to FIGS. 1 to 6.

Figure 1:
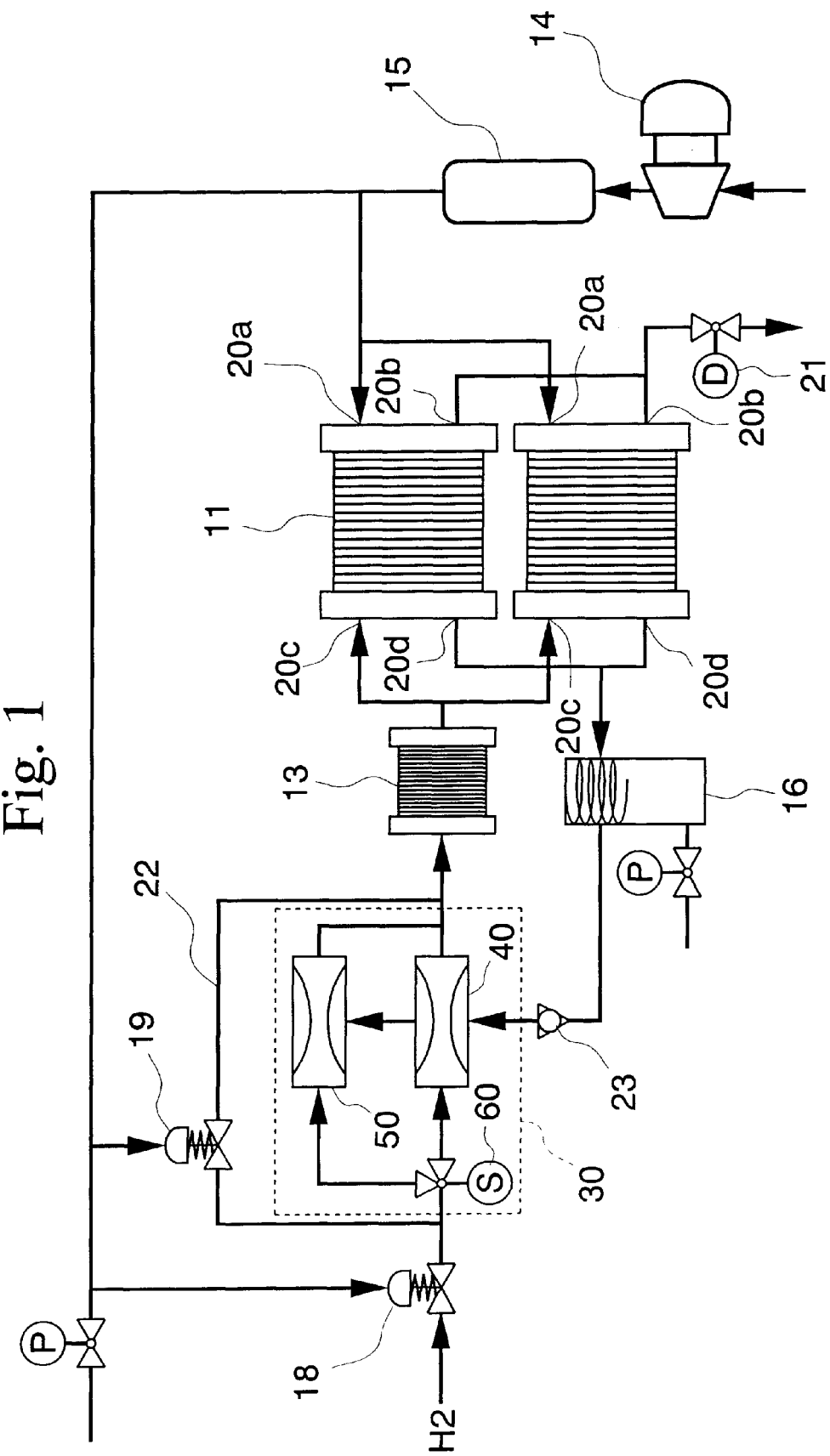
FIG. 1 is a diagram showing the structure of a fuel supply system for a fuel cell provided with a fuel supply system according to the present invention.

The first embodiment of the present invention is described with reference to FIGS. 1 to 5. FIG. 1 is a diagram showing the structure of a fuel supply system for a fuel cell provided with a fuel supply system according to the present invention. The present fuel supply system for the fuel cell is installed in a electric vehicle, or example, and the fuel supply system comprises a fuel cell 11, a humidifying portion 13, an oxidant supply portion 14, a heat exchanger 15, a water separating portion 16, an ejector unit 30 (fuel supply device), a fuel supply pressure control portion 18, and a bypass side pressure control portion 19.

The fuel cell 11 is composed of a plurality of unit cells each comprising an electrolyte membrane in the form of an ion exchange polymer membrane, disposed between an anode and cathode. The fuel cell comprises a fuel electrode to which hydrogen as a fuel is supplied and an air electrode to which air as an oxidant is supplied.

The air electrode comprises an air inlet 20a for supplying air from the oxidant supply portion 14 and an air outlet 20b for exhausting air and the like in the fuel electrode. The fuel electrode comprises a fuel supply port 20c comprising a fuel inlet 20c for supplying the fuel and a fuel outlet 20d for exhausting hydrogen and the like in the fuel electrode.

Hydrogen as the fuel is supplied to the fuel electrode of the fuel cell from the fuel inlet 20c through the fuel-supply-side pressure control portion 18, the ejector unit 30, and the humidifying portion 13.

The humidifying portion 13 supplies the fuel to the fuel cell after mixing hydrogen with moisture so as to ensure the ionic conductivity of the solid polymer electrolyte membrane.

Figure 2:
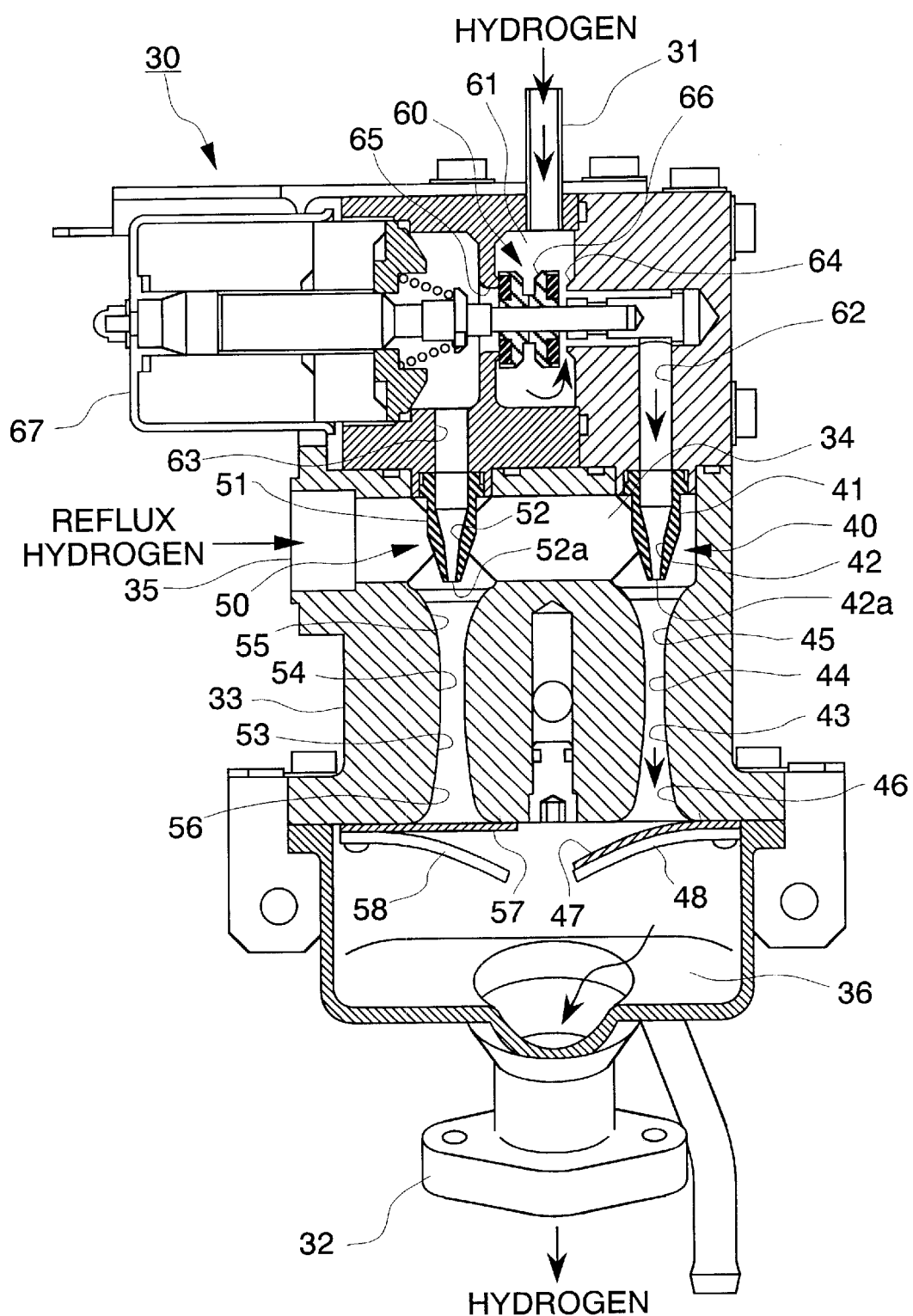
FIG. 2 is a cross-sectional diagram showing an ejector unit corresponding to the fuel supply device of the fuel cell according to the first embodiment of the present invention, when the ejector unit is functioned as the ejector for the small flow rate.
Figure 3:
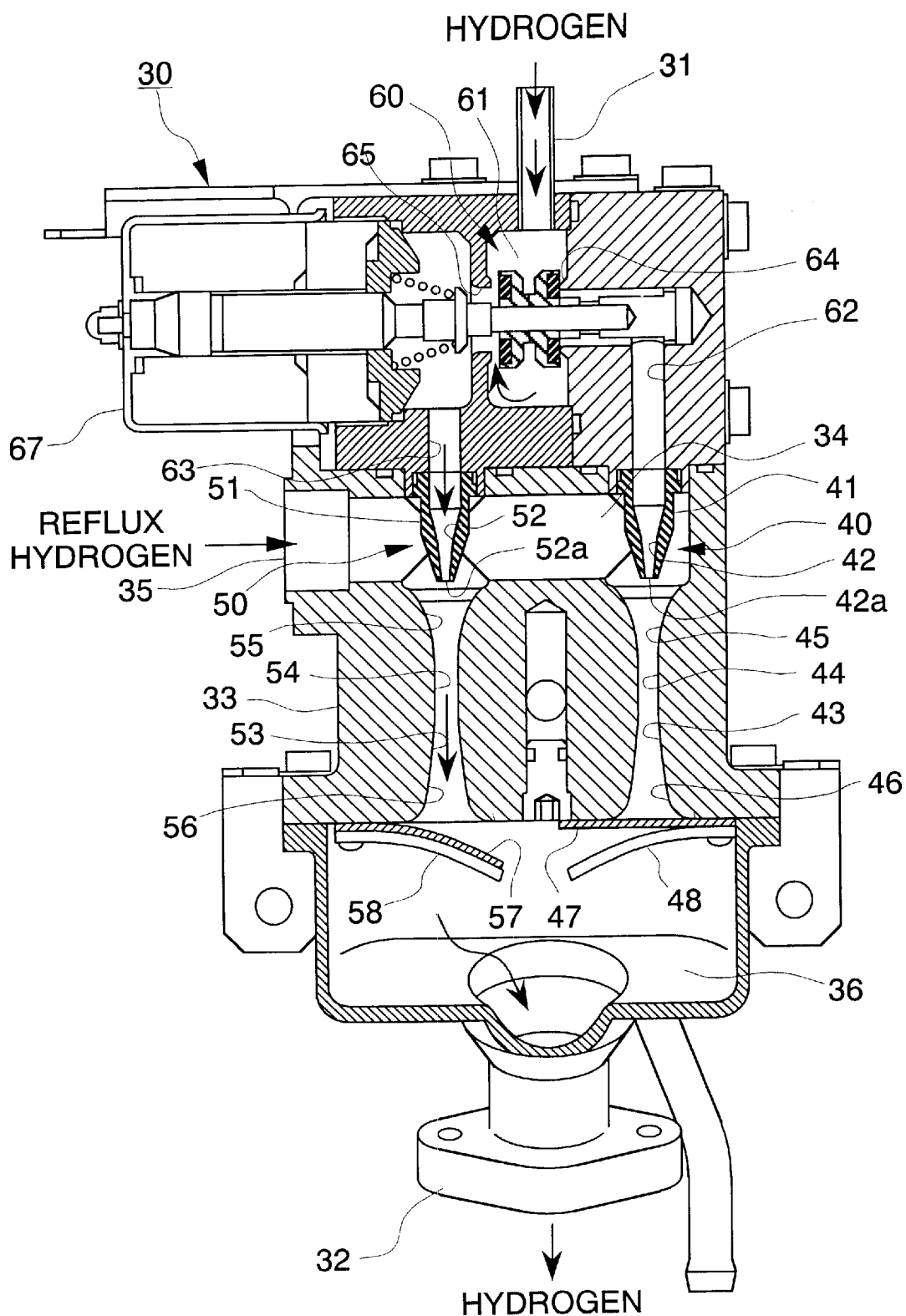
FIG. 3 is a cross-sectional diagram showing an ejector unit according to the first embodiment of the present invention, when the ejector unit is functioned as the ejector for the large flow rate.

The ejector unit 30 is disposed in a fuel passage, which connects the fuel-supply-side pressure control portion 18 and the humidifying portion 13. Although the structure of the ejector unit 30 will be described in detail later, as shown in FIGS. 1 to 3, the fuel-supply-side pressure control portion 18 is connected to the hydrogen inlet pipe 31 of the ejector unit 30, and the humidifying portion 13 is connected to the hydrogen outlet pipe 32. An exhaust fuel from the fuel discharge outlet 20d of the fuel cell is, after the water content is removed by the water separating portion 16, supplied to the reflux hydrogen inlet 35 of the ejector unit 30 through a check valve 23. The ejector unit 30 has a function to supply the fuel-supply-side pressure control portion 18 after mixing with the fuel discharged from the fuel cell 11.

In addition, a bypass passage is provided which makes a detour around the ejector unit in a passage connecting the fuel-supply-side pressure control portion 18 and the humidifying portion 13, and a bypass-side pressure control portion 19.

The oxidant supply portion 14 comprises, for example, an air compressor, which is controlled by the load of the fuel cell or the input signal from the accelerator pedal (not shown), and the oxidant supply portion 14 supplies air to the air electrode of the fuel cell 11 and also supplies air to the fuel-supply-side pressure control portion 18 and to the bypass-side pressure control portion 19.

The fuel-supply-side pressure control portion 18 and to the bypass-side pressure control portion 19 are constituted by, for example, air-operated proportional pressure control valves, which, using the air pressures supplied from the oxidant supply portion 14 as the signal pressure, set pressures at the outlets of respective pressure control portions, that is, the supply air pressures at respective predetermined pressures. The ratio of the signal air pressure to the supply air pressure for the fuel-supply-side pressure control portion 18 is set, for example, to 1:3, and the ratio for the bypass-side pressure control portion is set, for example, the signal air pressure to the supply pressure, to 1:1.

The ejector unit is described below with reference to FIGS. 2 and 3. The ejector unit 30 is constituted by a unit body 33 which comprises a hydrogen inlet pipe 31, connected to the fuel-supply-side pressure control portion 18, for supplying hydrogen and a hydrogen outlet pipe 32 for sending hydrogen to the humidifying portion 13, and the ejector unit 30 includes a first ejector 40, a second ejector 50 and a switching valve (an ejector switching device) 60 for selectively switching hydrogen supply to either one of the first ejector 40 and second ejectors 50.

The unit body 33 also comprises a valve chamber 61 communicating with the hydrogen inlet pipe 31, and a first passage 62 and a second passage 63 both connected to the valve chamber 61. Furthermore, an annular valve seat 64 is provided at the communicating portion communicating the valve chamber 61 and the first passage 62, and an annular second valve seat 65 is provided at the communicating portion communicating the valve chamber 61 and the second passage 63. The first valve seat 64 and the second valve seat 65 are disposed facing to each other and a valve body 66 is disposed between the first and second valve seats 64 and 65. The valve body 66 is supported movably by an electromagnetic actuator secured at the unit body 33, and the valve body 66 is attachable to or detachable from the first valve seat 64 and the second valve seat 65. The first passage 62 is connected to the nozzle 41 of the first ejector 40 and the second passage 63 is connected to the nozzle 51 of the second ejector 50.

Here, the valve chamber 61, the first passage 61, the second passage 63, the first valve seat 64, the second valve seat 65, the valve body 66, and the electromagnetic actuator 67 constitute a switching valve 60, which is ON/OFF controlled by a central electronic control unit (not shown) (hereinafer, called "ECU"). The valve body 66 of the seat switching valve 60 sits on the second valve 65 when the switching valve 60 is in the OFF state, and the valve body 66 sits on the first valve seat when it is in the ON state. Furthermore, when the valve body 66 sits on the second valve seat 65, since the valve chamber 61 and the first passage 62 is communicated and the valve chamber 61 and the second passage 63 is cut off, the entire quantity of hydrogen supplied from the hydrogen inlet pipe 31 to the valve chamber 61 is supplied to the first passage 62 and is not supplied to the second passage 63. In contrast, when the valve body 66 sits on the first valve seat 64, since the valve chamber 61 and the second passage 63 is communicated and the valve chamber 61 and the first passage 62 is cut off, the entire quantity of hydrogen supplied from the hydrogen inlet pipe 31 to the valve chamber 61 is supplied to the second passage and is not supplied to the first passage 62.

The unit body 33 comprises a reflux chamber 34 and the reflux chamber 34 is connected to the hydrogen reflux inlet 35 which is opened to the outside of the unit body 33. The nozzle 41 of the first ejector 40 and the nozzle 51 of the second ejector 50 are fixed at the unit body 33 while top ends of both nozzles 41 and 51 protrude into the reflux chamber 34 and while axial lines of nozzles 41 and 51 are disposed in parallel to each other. Both nozzles 41 and 51 comprises respective fuel passages 42 and 52 which pass through along directions of respective axial lines, and diameters of both fuel passages 42 and 52 narrow as the passages advance towards the top end (downward), and the ends of the passages constitute the top openings 42a and 52a.

The unit body 33 comprises two diffuser passages (diffusers) 43 and 53, connected to the reflux chamber 34. The diffuser passage 43 is disposed downward of the nozzle 41 on the same axial line of the nozzle 41, and the diffuser passage 53 is disposed downward on the same axial line of the nozzle 51. The diffuser passage 43 comprises a throat portion 44, where the inner diameter becomes minimum, in the middle of the diffuser passage 43. Upstream of the throat portion 44, a contracting portion 45 is provided where the inner diameter gradually decreases as the diffuser passage advances downwardly (downward in FIGS. 2 and 3). Downstream of the throat portion 44, an expanding portion 46 is provided where the inner diameter of the diffuser passage gradually expands as the diffuser passage advances downwardly. The angle of expansion of the expanding portion 46 is smaller than the angle of the contracting portion 45. The diffuser passage 53 is also provided with, similarly to the diffuser passage 43, the throat portion 54, the contracting portion 55, and the expansion portion 56.

Each diffuser passage 43 or 54 is connected to the merging passage 36, which is communicated with the hydrogen outlet pipe 32. At both outlets of diffuser passage 43 and 53, lead valves 47 and 57 for checking the back-flow and stoppers 48 and 58 are provided, respectively. The ejector unit is, therefore, constituted such that when the fuel passes through the fuel passage 43, the lead valve 57 closes so as to stop the diffuser passage 53, and when the fuel passes through the diffuser passage 53, the lead valve 47 closes so as to stop the diffuser passage 43. According to the above-described construction, it is possible to prevent the fuel after passing through the diffuser passage 43 from refluxing into the diffuser passage 53 from the merging passage 36, which causes the fuel to be circulated between the diffuser passages 43 and 53. Accordingly, it is possible prevent the substantial decrease in the amount of the reflux hydrogen.

Here, the nozzle 41, the diffuser passage 43 and the reflux chamber 34 constitutes the first ejector 40, and when hydrogen is injected from the opening 42a of the nozzle 41 to the diffuser passage 43, a negative pressure is generated around the throat portion 44 of the diffuser passage 43, and by this negative pressure, the reflux hydrogen is drawn from the reflux chamber 34 into the diffuser passage 43, so that the hydrogen injected from the nozzle 41 and the reflux hydrogen drawn from the reflux chamber 34 are mixed in the diffuser passage 43.

The nozzle 51, the diffuser passage 53, and the reflux chamber 34 constitutes the second ejector 50. When hydrogen is ejected from the opening 52a of the nozzle 51 to the diffuser passage 53, a negative pressure is generated around the throat portion 54 of the diffuser passage 53, and by this negative pressure, the reflux hydrogen is drawn from the reflux chamber 34 into the diffuser passage 53, so that the hydrogen injected from the nozzle 41 and the reflux hydrogen drawn from the reflux chamber 34 are mixed in the diffuser passage 53.

Note that the inner diameter of the nozzle 41 in the first ejector 40 and the inner diameter of the diffuser passage 43 are set to be smaller than the inner diameter of the nozzle 51 of the second ejector 50 and the inner diameter of the diffuser passage 53. Accordingly, the first ejector 40 functions as a small flow rate ejector, which satisfies the required stoichiometric value when the hydrogen flow rate is low. In contrast, the second ejector 50 functions as a large flow rate ejector, which satisfies the required stoichiometric value when the hydrogen flow rate is high. For example, the inner diameter of the opening 42a of the nozzle 41 is set to 1.0 mm, and the inner diameter of the diffuser passage 43 at its throat portion 44 is set to 4.0 mm, the inner diameter of the opening 42a of the nozzle 41 is set to 1.0 mm, and the inner diameter of the diffuser passage 43 at its throat portion 44 is set to 4.0 mm; and the inner diameter of the opening 52a of the nozzle 51 is set to 1.5 mm, and the inner diameter of the diffuser passage 53 at its throat portion 54 is set to 4.5 mm.

Next, an action of this ejector unit 30 is described.

The switching valve 60 of the ejector unit 30 is controlled based on the output current of the fuel cell 11. When the output current of the fuel cell 11 is below a predetermined value, the switching valve 60 is maintained in the OFF state, and when the output current of the fuel cell 11 is above a predetermined value, the switching valve 60 is maintained at the ON state.

When the switching valve is in the OFF state, since the valve body 66 sits on the second valve seat 65, hydrogen supplied from the hydrogen inlet pipe 31 to the valve chamber 61 flows to the fuel passage 42 of the nozzle 41 through the first passage 62 and is injected from the opening 42a of the nozzle 41 to the diffuser passage 43. Then, the reflux hydrogen supplied from the reflux chamber 34 through the reflux hydrogen inlet 35 is drawn into the diffuser passage 43 by the negative pressure generated around the throat portion 44 of the diffuser passage 43. As a result, hydrogen ejected from the nozzle 41 and reflux hydrogen drawn from the reflux chamber 34 are mixed in the diffuser passage 43, and the mixture is delivered to the merging passage 36 through the lead valve 47. Hydrogen is then supplied to the fuel cell 11 from the merging passage 36 through a hydrogen outlet pipe 32 and through the humidifying device 13. At this time, note that since the valve seat 66 cuts off or blocks the connection between the valve chamber 66 and the second passage 63, hydrogen does not flow to the second passage 63, and hydrogen is not ejected from the opening 52a of the nozzle 51.

Consequently, when the output current of the fuel cell 11 is below the predetermined value, and when the fuel consumption is low, only the first ejector 40 in the ejector unit 30 operates and the second ejector 50 does not operate. According to the first ejector 40, it is possible to obtain the predetermined stoichiometric value, which is slightly higher than the required stoichiometric value for a small flow rate.

In addition, since a lead valve is provided downstream of the diffuser 53, the back-flow from the merging passage 36 to the diffuser passage 53 can be prevented when the switching valve 60 is in the OFF state. Furthermore, since the pressure in the reflux chamber 34 is below that of the merging passage 36, reflux hydrogen in the reflux chamber 34 does not flow out to the merging passage 36 through the diffuser passage 53.

In contrast, when the switching valve 60 is turned to the ON state, since the valve body 66 sits on the first valve seat 64, hydrogen supplied from the hydrogen inlet pipe 31 to the valve chamber 61 flows into the fuel passage 52 of the nozzle 51 through the second passage 63, and is ejected towards the diffuser passage 53 from the opening 52a of the nozzle 51. Then, due to the negative pressure generated around the throat portion 54 of the diffuser passage 53, reflux hydrogen in the reflux chamber 34 is drawn into the diffuser passage 53. As a result, hydrogen ejected from the nozzle 51 and reflux hydrogen drawn from the reflux chamber 34 are mixed in the diffuser passage 53 and delivered to the merging passage 36 through a lead valve 57. Hydrogen in the merging passage 36 is delivered to the fuel cell 11 after passing through the hydrogen outlet pipe 32 and the humidifying device 13. At this time, note that since the valve body 66 cuts off the connection between the valve chamber 61 and the first passage, hydrogen in the valve chamber does not flow in the first passage 62 and ejection of hydrogen from the opening 42a of the nozzle 41 never takes place.

That is, when the output current of the fuel cell 11 exceeds a predetermined value and the hydrogen consumption is high, only the second ejector 50 in the ejector unit 30 operates and the first ejector does not operate. According to the second ejector 50, it is possible to obtain a stoichiometric value which is slightly higher than the required stoichiometric value for a large flow rate.

In addition, since a lead valve is provided downstream of the diffuser 43, the back-flow from the merging passage 36 to the diffuser passage 43 can be prevented when the switching valve 60 is in the ON state. Furthermore, since the pressure in the reflux chamber 34 is below that of the merging passage 36, reflux hydrogen in the reflux chamber 34 does not flow out to the merging passage 36 through the diffuser passage 43.

Figure 4:
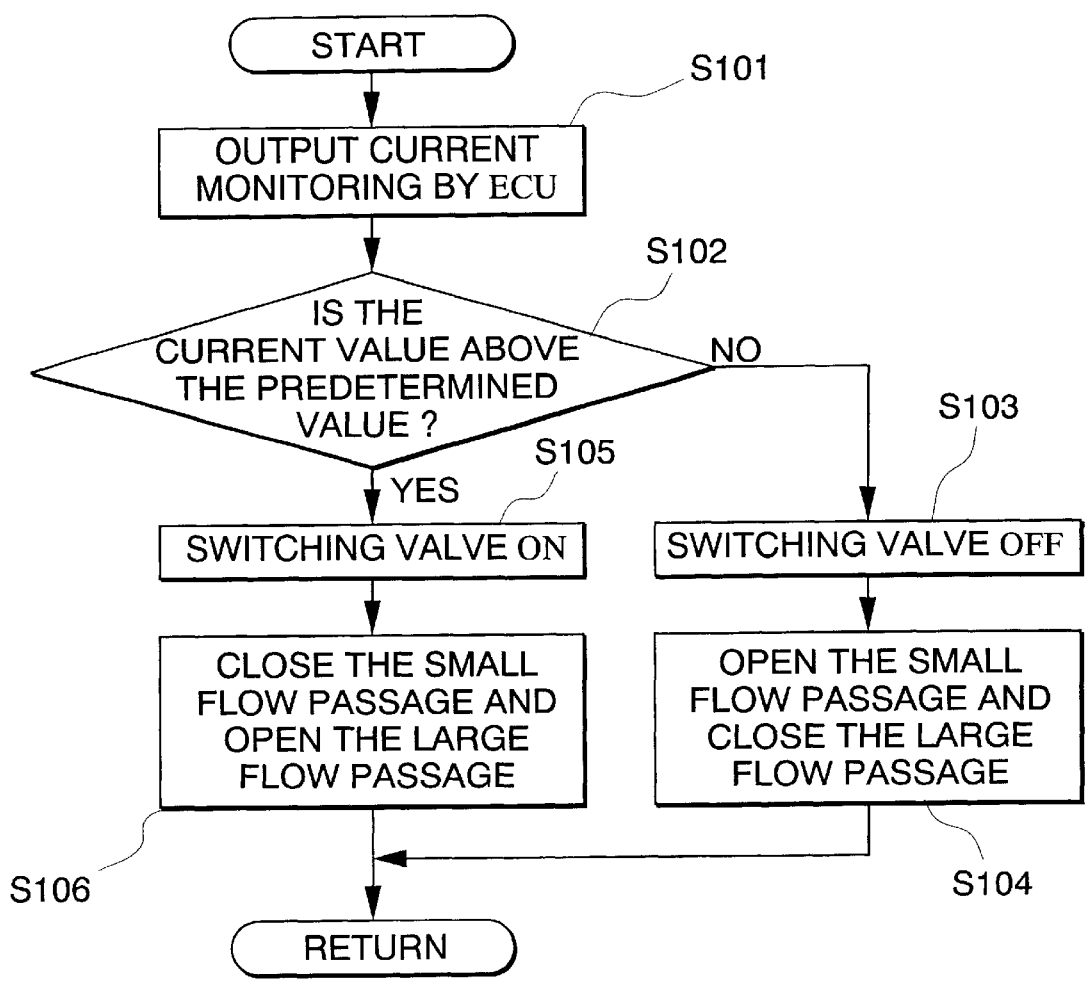
FIG. 4 is a flowchart showing a switching control of the ejector unit according to the first embodiment of the present invention.

FIG. 4 shows a flowchart for switching the ejectors.

First, in step S101, the ECU monitors the output current of the fuel cell 11, and the flow proceeds to step S102, wherein it is determined whether the output current exceeds a predetermined value.

When the determination in step S102 is "NO", the flow proceeds to step S103, wherein the switching valve 60 is turned to the OFF state. Then, in step S104, the first passage 62 (the small flow passage) is opened, and the second passage 63 (the large flow passage) is closed. As a result, the ejector unit 30 functions as the small flow ejector.

In contrast, when the determination in step S102 is "YES", the flow proceeds to step S105, wherein the switching valve 60 is turned to the ON state. Then, in step S106, the second passage 63 (the large flow passage) is opened and the first passage 62 (the small flow passage) is closed. As a result, the ejector unit 30 functions as the large flow ejector.

Next, the action of the fuel supply system for the fuel cell in the present embodiment is explained.

First, air at an appropriate pressure (a signal pressure Pt), which is determined based on the load of the fuel cell 11 and the control opening of the accelerator pedal, is supplied to the air electrode of the fuel cell 11, the fuel-supply-side pressure control portion 18, and the bypass-side pressure control portion 19.

The fuel-supply-side pressure control portion 18 supplies hydrogen to a hydrogen inlet pipe 31 of the ejector unit 30 and the bypass passage 22 after controlling the supply pressure at three times of the signal pressure Pt, that is, at a supply pressure Pse=3Pt.

In addition, the bypass-side pressure control portion 19 of the bypass passage 22 is set to supply hydrogen at the same pressure as that of the signal pressure, that is, at the supply pressure of Psb=Pt. Thus, this supply pressure Psb is set at a pressure lower than the supply pressure Pse from the fuel-supply-side pressure control portion 18.

When the output current of the fuel cell 11 is below the predetermined value and when the hydrogen flow to be supplied to the fuel electrode is small, the switching valve 60 is controlled to be in the OFF state, and hydrogen supplied from the fuel-supply-side control portion 18 is supplied to the first ejector 40 through the switching valve 60.

Under the above-described conditions, when the fuel flow supplied to the fuel cell 11 is quite small, the pressure loss at the nozzle 41 is also small, and the outlet pressure of hydrogen at the outlet of the diffuser passage 43 is nearly equal to the supply pressure Pse supplied from the fuel-supply-side pressure control portion 18, and the outlet pressure of hydrogen is set to a larger value than that set at the bypass-side pressure control portion 19.

Accordingly, the valve of the bypass-side pressure control portion 19 is not opened and thus the flow supplied from the bypass passage 22 to the fuel cell 11 is zero, and the stoichiometric value is determined by the stoichiometric value of the first ejector 40.

In addition, as the hydrogen flow passing through the nozzle 41 of the first ejector 40 increases, the pressure loss of the hydrogen at the nozzle 41 of the first ejector 40 increases, and when the hydrogen pressure at the outlet of the diffuser passage 43 of the first ejector 40 decreases below the supply pressure Psb, which is set at the bypass-side pressure control portion, the valve at the bypass-side pressure control portion 19 is opened and the amount of hydrogen flow supplied to the fuel cell 11 from the bypass passage 22 gradually increases; thereby, hydrogen is supplied to the fuel cell 11 from the bypass passage 22 as well.

Furthermore, when the amount of hydrogen consumed by the fuel cell 11 increases, and when the output current of the fuel cell 11 exceeds the above-described predetermined value, the switching valve 60 is switch controlled from the OFF state to the ON state, so that hydrogen supplied from the fuel-supply-side pressure control portion 18 is supplied to the second ejector 50 through the switching valve 60.

After the switching valve 60 is switched, when the amount of hydrogen supplying to the fuel cell 11 is intermediate, the pressure loss at the nozzle 51 is relatively small and the outlet pressure of hydrogen at the outlet of the diffuser passage 53 of the second ejector 50 is larger than the hydrogen supply pressure Psb determined by the bypass-side pressure control portion 19.

Thus, the valve of the bypass-side pressure control portion 19 is not opened and the hydrogen flow supplied to the fuel cell 11 is zero, so that the stoichiometric value is determined by the stoichiometric characteristics of the second ejector 50.

Furthermore, as the flow of hydrogen passing through the nozzle 51 of the second ejector 50 increases, the pressure loss of hydrogen at the nozzle 51 of the second ejector increases, and when the hydrogen pressure at the outlet of the diffuser passage 53 of the second ejector 50 decreases below the supply pressure Psb determined by the bypass-side pressure control portion 19, the valve of the bypass-side pressure control portion 19 is opened, the flow of hydrogen supplied to the fuel cell 11 from the bypass passage 22 gradually increases and hydrogen is also then supplied to the fuel cell 11 through the bypass passage 22. Accordingly, a shortfall of hydrogen by the separate use of the second ejector 50 can be supplied to the fuel cell 11 through the bypass passage 22.

Figure 5:
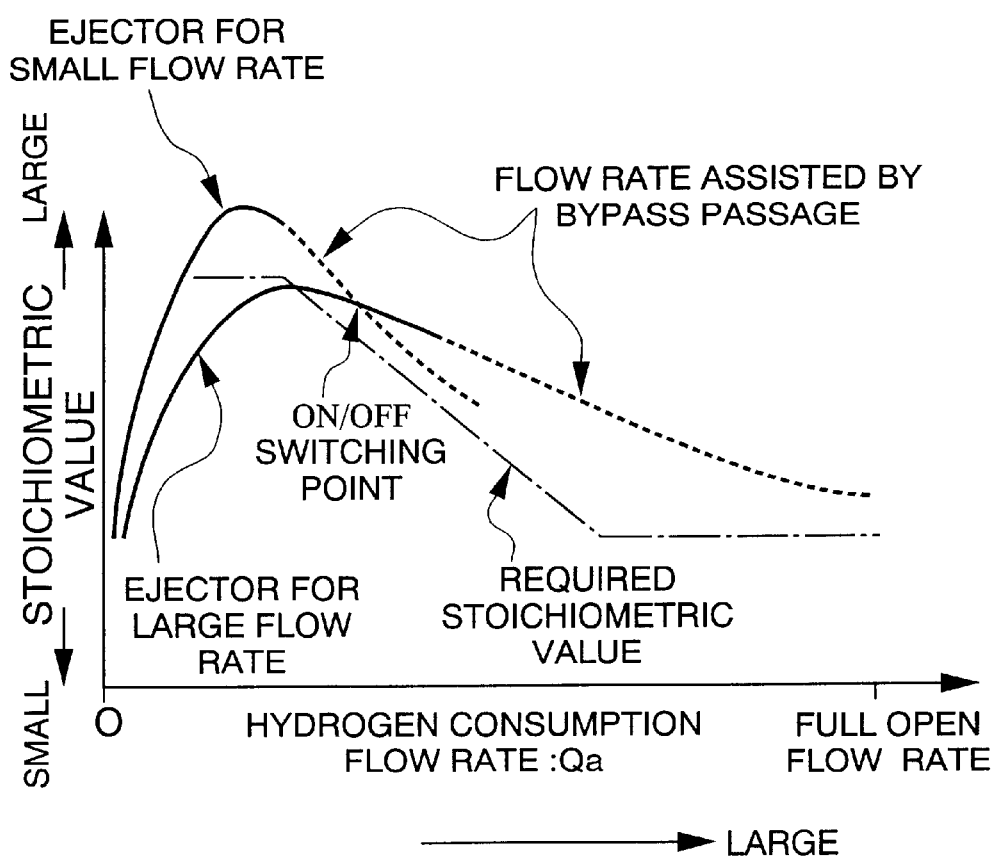
FIG. 5 is a diagram showing the stoichiometric characteristics of the first embodiment of the present invention.

FIG. 5 shows stoichiometric characteristics of a fuel supply system according to the present embodiment, and it is confirmed from the above FIG. 5 that larger stoichiometric values than the necessary stoichiometric values over nearly the entire flow regions from the small flow rate to the large flow rate are obtained. Note that broken lines in FIG. 5 shows the time when the fuel is supplied from the bypass passage 22.

As shown above, according to the fuel supply system provided with an ejector unit according to the present embodiment, it is possible to circulate the reflux hydrogen in the fuel cell 11 by operating either one of the first and second ejectors 40 and 50. Moreover, since the first ejector has stoichiometric characteristics as a small flow ejector and the second ejector has stoichiometric characteristics as a large flow ejector, the ejector unit is capable of delivering necessary fuel to the fuel cell 11 while preserving the predetermined stoichiometric characteristics over a wide flow rate range from a small flow rate during idling to larger flow rates.

In addition, since the ejector unit includes two ejectors 40 and 50 and a switching valve 60 in the unit body 33, it is possible to reduce the size of the fuel supply system.

Furthermore, the switching valve 60 is switched depending on the output current of the fuel cell 11, and each ejector is selected appropriately such that the required amount of hydrogen for the fuel cell 11 can be delivered reliably.

Note that the actual output current is used as the input signal for determining the amount of the hydrogen flow in the above embodiment, the other variables such as a target current or the measured/target hydrogen flow may be used.

Figure 6:
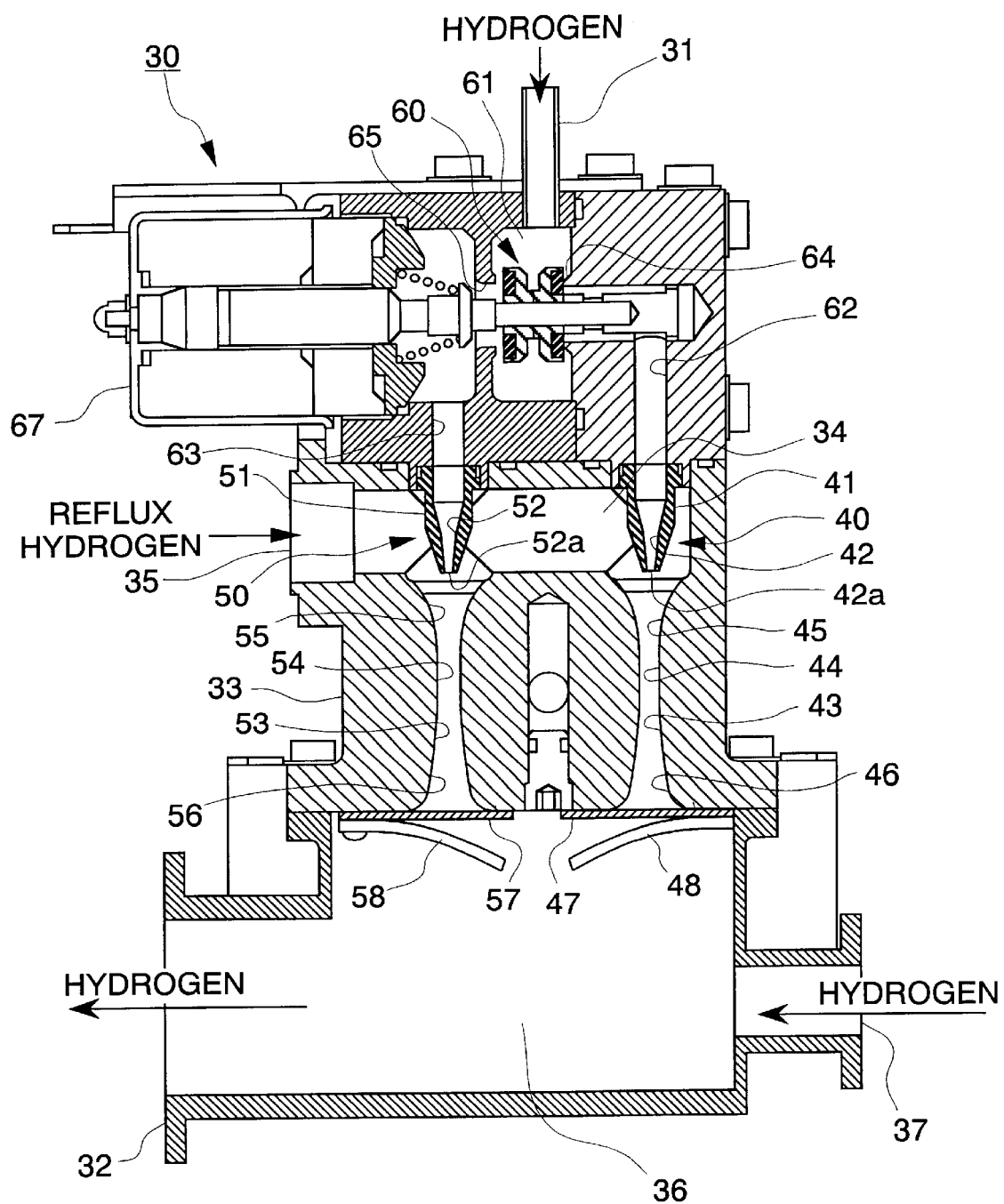
FIG. 6 is a cross-sectional diagram showing a fuel supply device for the fuel cell according to the second embodiment of the present invention.
Figure 7:
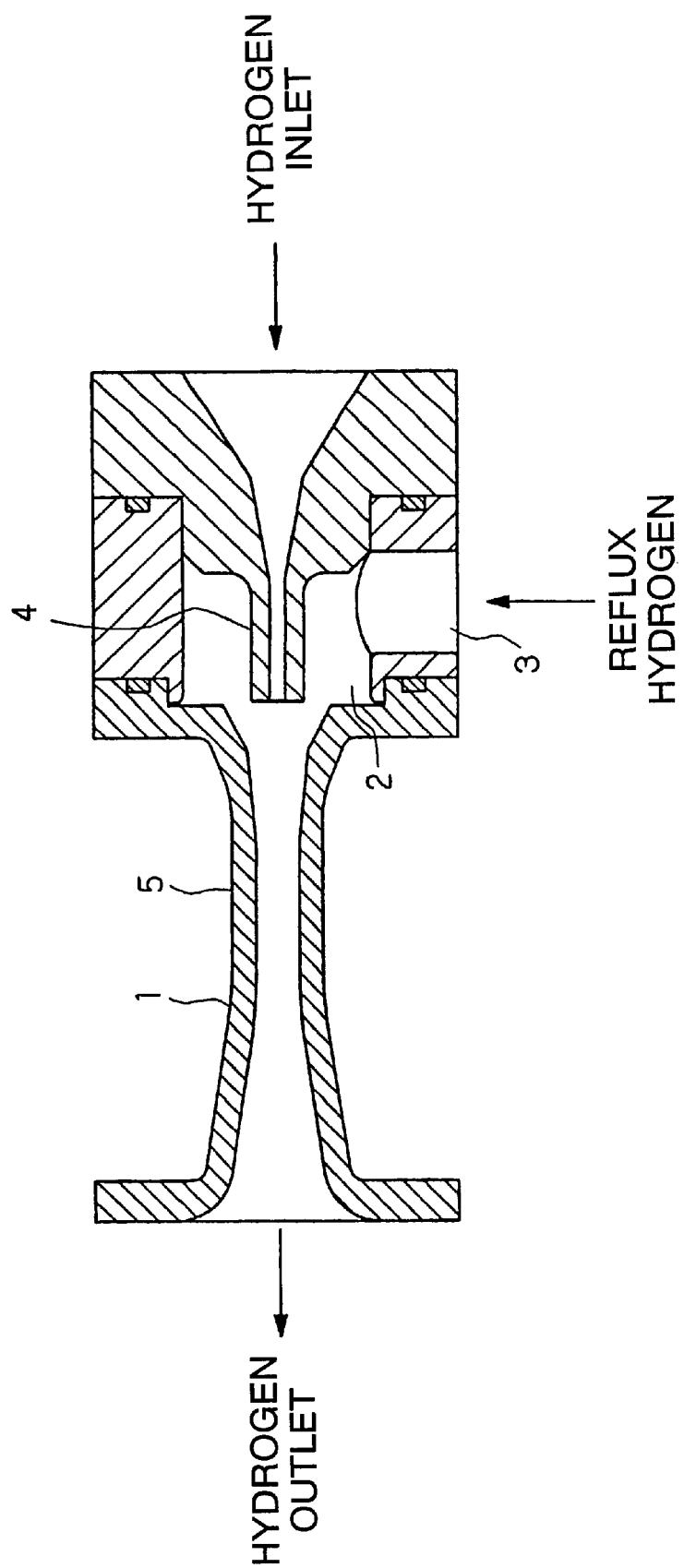
FIG. 7 is a cross-sectional diagram showing a conventional ejector.
Figure 8:
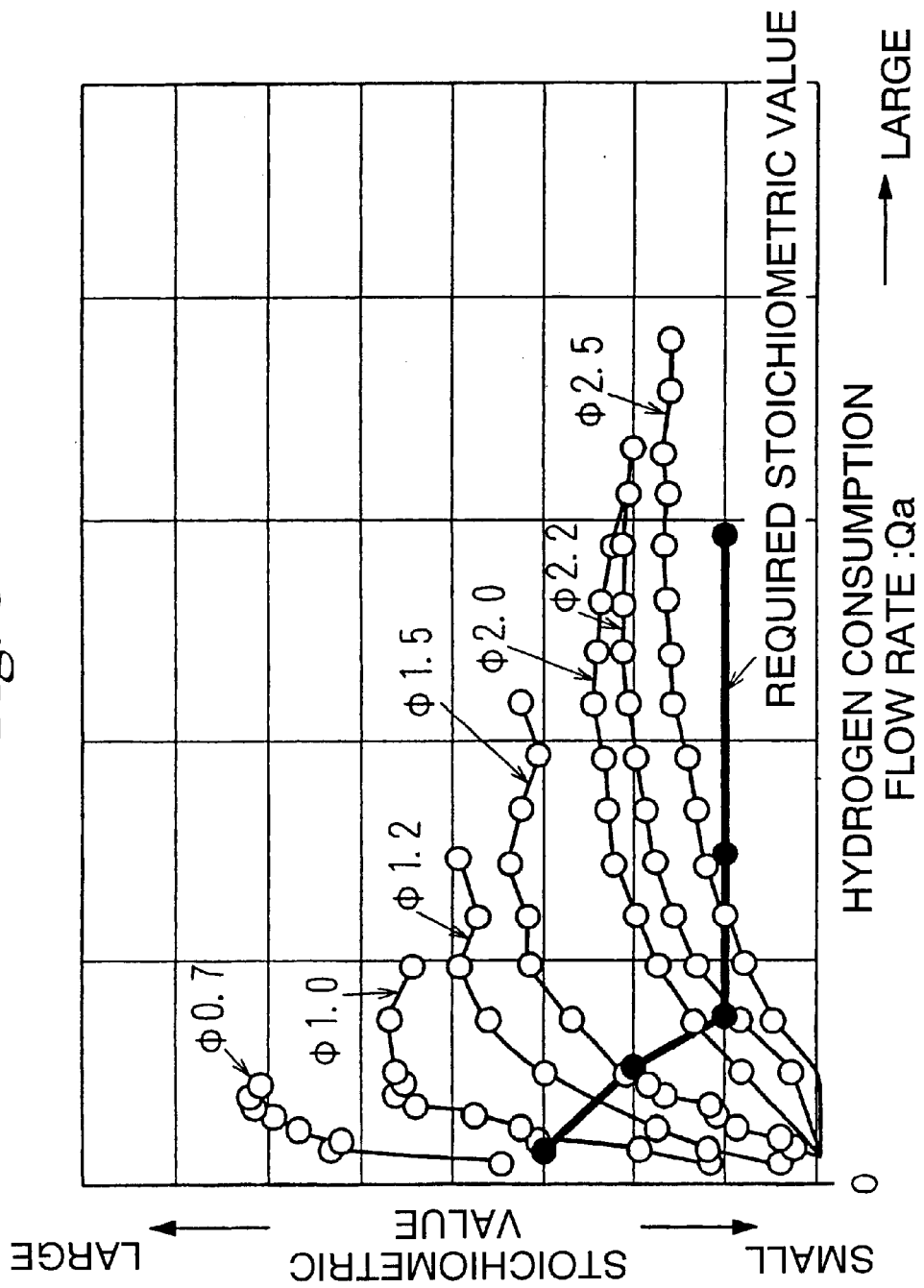
FIG. 8 is a diagram showing the relationship between the stoichiometric value and the supplying flow rate using a nozzle size as a parameter for the conventional ejector.

The second embodiment of the fuel supply device for the fuel cell according to the present invention is described below with reference to FIG. 6. FIG. 6 is a cross-sectional diagram of an ejector unit according to the second embodiment.

The point that distinguishes the second embodiment from the first embodiment is that the second embodiment is provided with a bypass hydrogen inlet at the unit body 33. That is, in the second embodiment, a hydrogen outlet pipe 32 is provided at one end of the merging passage 36 in the unit body 33, and a bypass hydrogen inlet 37 is provided at another end of the merging passage 36, and the bypass hydrogen inlet 37 is connected to the downstream end of the bypass passage 22.

The ejector unit 30 constituted as described above has the following action, in addition to the actions of the above-described first embodiment. That is, hydrogen supplied from the first ejector 40 or the second ejector 50 and hydrogen supplied from the bypass passage 22 can be delivered to the fuel cell 11 after they are sufficiently mixed in the merging passage 36 of the unit body 33. Since the ejector unit 30 can be unitized including the merging portion of hydrogen, the fuel supply system can be constituted as a compact device.

Since the other elements are the same as those of the first embodiment, these elements are denoted by the same reference numbers and their explanations are omitted.

Although the bypass passage 22 and the bypass-side pressure control portion 19 are provided in both the first and second embodiment, they can be omitted. The number of ejectors included in the unit body 33 is not limited to two, and three or more ejectors may be provided. In such cases, it is necessary to constitute an ejector switching devices so as to operate each ejector separately.

As described above, the fuel supply device for the fuel cell according to the first aspect is capable of operating any one of the ejectors using an ejector switching device, and since it is possible to change the flowing characteristics of the fuel supply device by changing the nozzle diameter and the diffuser diameter of each ejector, it is possible to supply a necessary amount of fuel to the fuel cell while ensuring the predetermined stoichiometric characteristics over a wide range of hydrogen flow rate from a small flow rate at idling to a large flow rate. In addition, since the ejector body includes a plurality of ejectors and the ejector switching devices, it is possible to reduce the size of the fuel supply device.

In addition to the above-described effect of the first aspect, the fuel supply device according to the second aspect of the present invention is capable of delivering the fuel after merging the first fuel supplied from the ejector and the first fuel other than that supplied from the ejector, it is possible to replenish the shortfall of the fuel supplied from the ejector and to deliver a large amount of hydrogen to the fuel cell. In addition, it is possible to reduce the size of the fuel supply device provided with a bypass passage.

The fuel supply device according to the third aspect is capable of selecting an appropriate ejector depending upon the required flow rate, and it is possible to supply the necessary amount of fuel with an optimum stoichiometric value to the fuel cell.

What is claimed is:

1. A fuel supply device for a fuel cell comprising:
   a plurality of ejectors, each comprising;
   a nozzle connected with a fuel passage for ejecting a first fuel; and
   a diffuser, which draws a second fuel by a negative pressure generated by the ejection of said first fuel along the axial direction of said nozzle, for supplying said second fuel by being mixed with said first fuel;
   an ejector switching device constituted so as to be able to select and switch any one of said fuel passage of said nozzle among said plurality of ejectors; and
   a housing which includes said plurality of ejectors and said ejector switching device.

2. A fuel supply device for a fuel cell according to claim 1, wherein said housing comprises a first passage, in which the first fuel that is delivered to the first passage after being supplied to said plurality of ejectors and a third fuel that is supplied to the first passage bypassing the plurality of ejectors can be mixed.

3. A fuel supply device for a fuel cell according to claim 1, wherein said fuel supply device further comprises a control device for controlling said ejector switching device in response to an input signal corresponding to a required amount of flow.

4. A fuel supply device for a fuel cell according to claim 2, wherein said fuel supply device further comprises a control device for controlling said switching device in response to an input signal corresponding to a required amount of flow.

* * * * *

UNITED STATES PATENT AND TRADEMARK OFFICE
CERTIFICATE OF CORRECTION

PATENT NO. : 6,670,067 B2
DATED : December 30, 2003
INVENTOR(S) : Katumi Sato et al.

It is certified that error appears in the above-identified patent and that said Letters Patent is hereby corrected as shown below:

<u>Title page,</u>
Item [75], Inventors, please change the first inventor's last name to read as follows:
-- Katumi Saito, Wako (JP) --

Signed and Sealed this

Tenth Day of August, 2004

JON W. DUDAS
*Acting Director of the United States Patent and Trademark Office*